Figure 8:
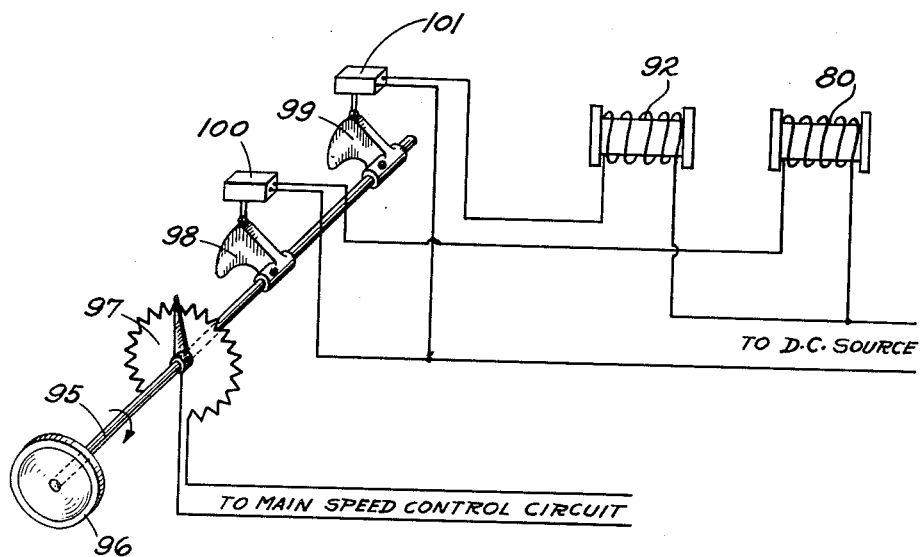

Dec. 21, 1954
P. G. SNYDER
2,697,506
CONVEYER FOR SHEET MATERIAL
Filed Aug. 19, 1950
4 Sheets-Sheet 1
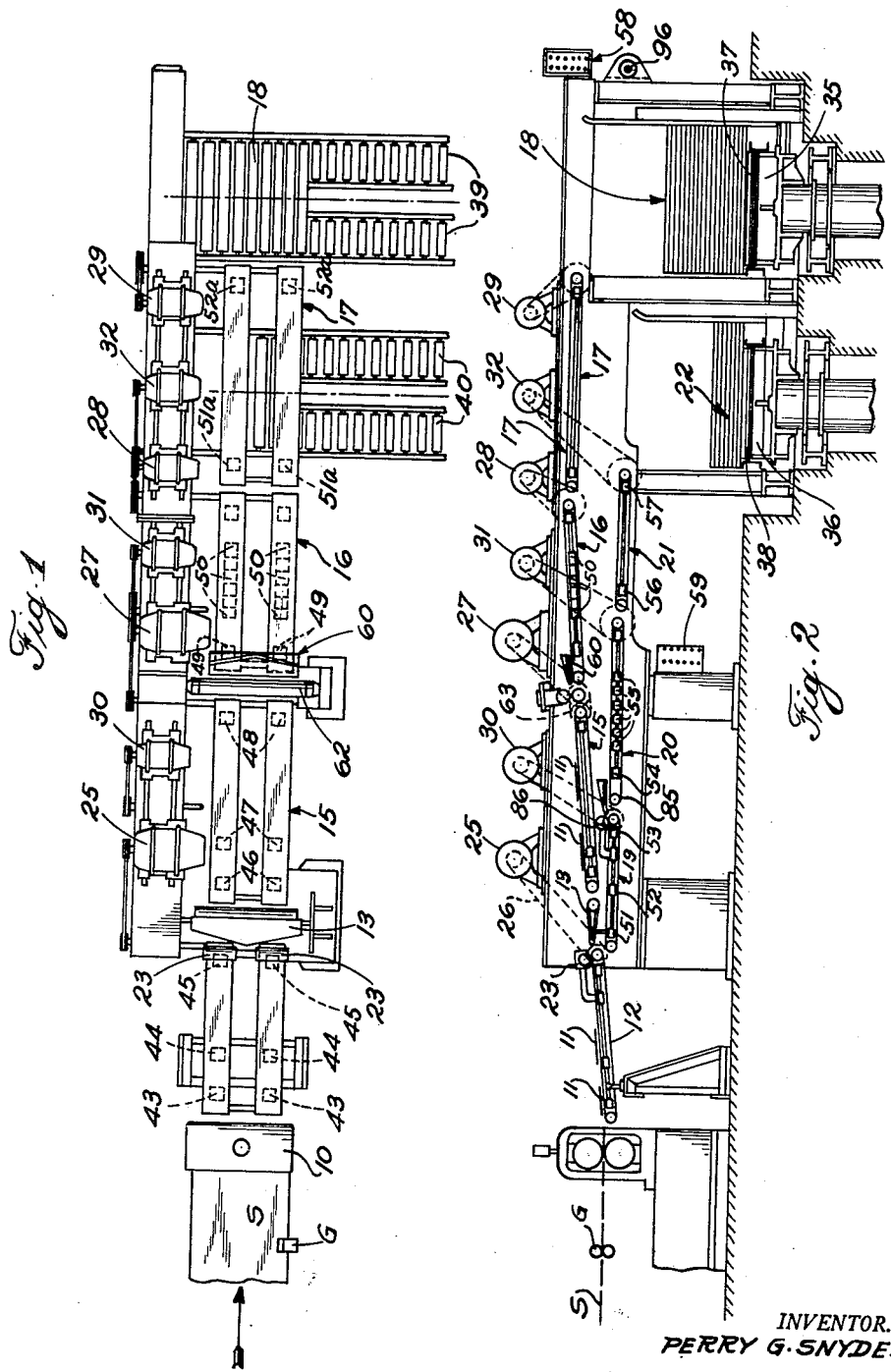
INVENTOR.
PERRY G. SNYDER
BY
ATTORNEYS

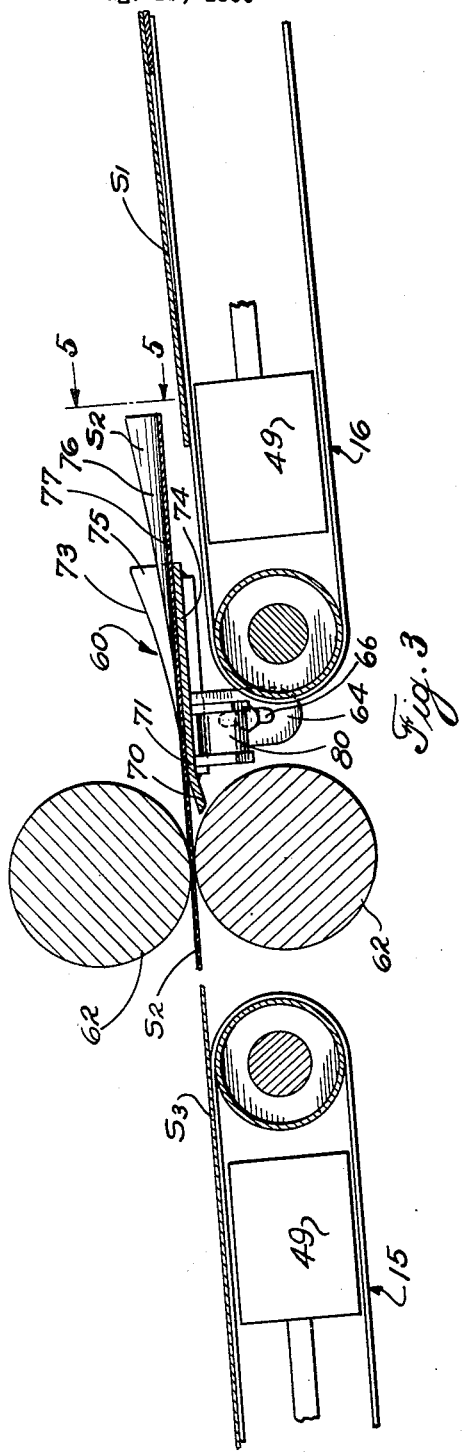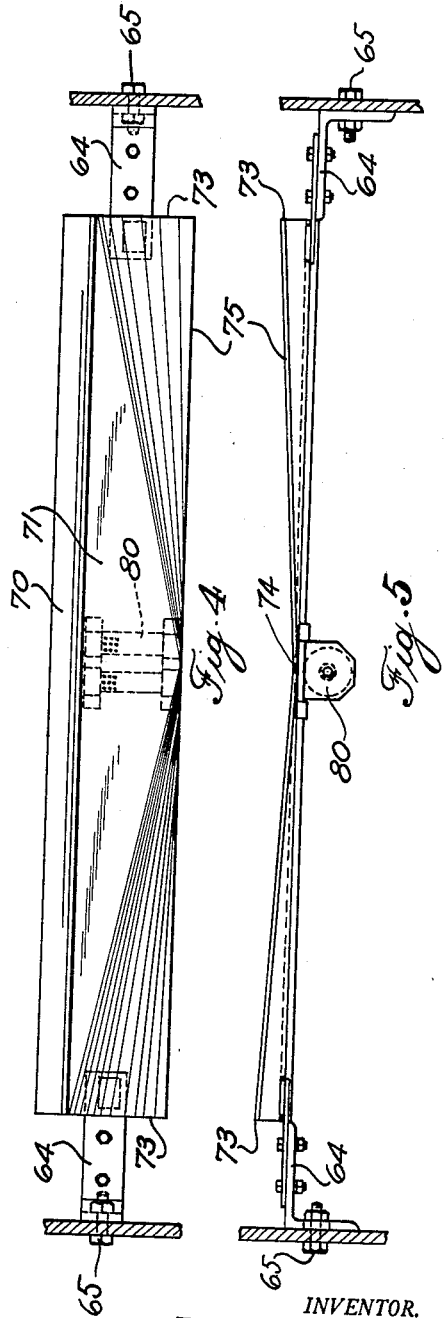

Dec. 21, 1954     P. G. SNYDER     2,697,506
CONVEYER FOR SHEET MATERIAL
Filed Aug. 19, 1950     4 Sheets-Sheet 3
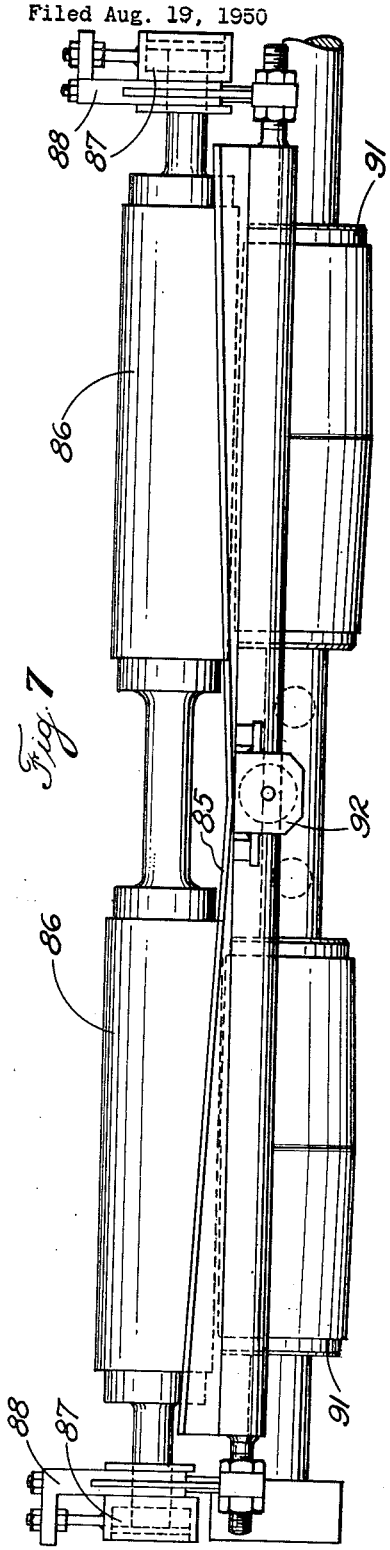
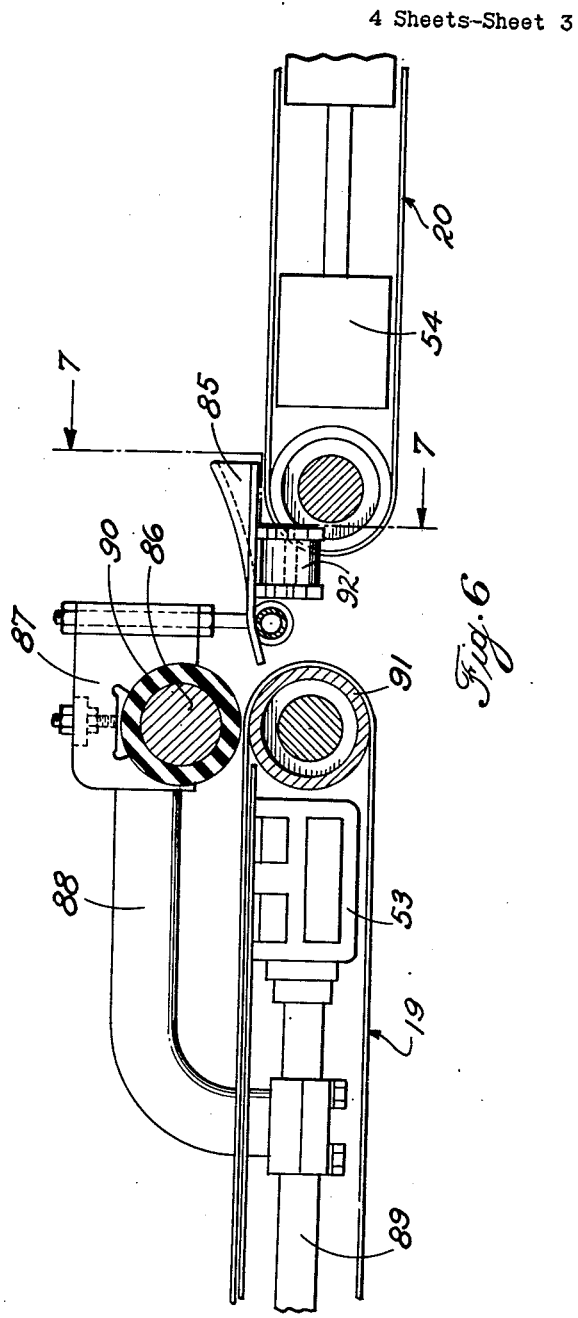
INVENTOR.
PERRY G. SNYDER
BY
Bosworth & Sessions
ATTORNEYS Dec. 21, 1954

P. G. SNYDER 2,697,506

CONVEYER FOR SHEET MATERIAL

Filed Aug. 19, 1950

4 Sheets-Sheet 4

INVENTOR.
PERRY G. SNYDER
BY
Bosworth & Sessions
ATTORNEYS

United States Patent Office 2,697,506
Patented Dec. 21, 1954

2,697,506

CONVEYER FOR SHEET MATERIAL

Perry G. Snyder, Youngstown, Ohio, assignor to The Aetna-Standard Engineering Company, Youngstown, Ohio, a corporation of Ohio Application August 19, 1950, Serial No. 180,329

11 Claims. (Cl. 198—35)

This invention relates to conveyors for sheet material and to methods of conveying sheet material, and particularly to conveyors of the type employed in classifying lines in which tin plate and the like in strip form is sheared into sheets, separated in accordance with its thickness as determined by a gauge or in accordance with other characteristics, and conveyed and piled in two or more separate piles of prime sheets and reject sheets. The invention is described herein in its application to the production of tin plate but it is to be understood that the invention may be used in conjunction with other materials and other types of apparatus and that the description of the preferred form of apparatus contained herein is given only by way of example.

Apparatus for classifying sheet metal such as tin plate are well known, one successful type of apparatus being shown, for example, in United States Patent No. 2,291,261, issued July 28, 1942, to Clarence L. Taylor; in the present application the invention is described as applied to a classifier of the general type disclosed in said Taylor patent. In the operation of such classifiers, tin plate in strip form is first gauged by a flying micrometer, then sheared into sheets by a flying shear. The sheets are discharged onto a belt conveyor moving at a speed substantially higher than the speed of the strip entering the shear so that the sheets are spaced on the belt conveyor. From the belt conveyor, the sheets pass to a classifying station which comprises a flipper arranged to pass sheets of the desired thickness, as determined by the gauge, to one flight or series of conveyors and to deflect sheets which are not of the desired gauge to another flight or series of conveyors. The flipper is operated from the flying micrometer by suitable electrical means with appropriate time delay. This type of operation is disclosed in the aforesaid Taylor patent and also in the Kaufman Patent No. 2,146,581, issued February 7, 1939.

In some instances the sheets may be passed through other classifying stations and again separated in accordance with their characteristics, for example, the sheets may be subject to a visual inspection and sheets falling below a certain standard deflected to a separate flight or series of conveyors. In any event, the flights of conveyors lead to separate piles on which the sheets of various characteristics are deposited.

In order to obtain high production and economical operation the shearing and classifying operations are carried out at high strip speeds, say of the order of one thousand feet per minute. The high speeds introduce serious problems in connection with the handling of the sheets in their travel along the conveyors. In order to prevent damage to the sheets when they are deposited on the pilers it is essential that the sheets be slowed down as they travel along the flights of conveyors and be discharged onto the pilers at speeds considerably less than the speed of the strip as it enters the shear.

The slowing down of the sheets necessitates that they lie on the conveyor belts in overlapping or shingled fashion as disclosed, for example, in the aforesaid Taylor patent. Carrying out the shingling operation at high speeds introduces difficulties because of the tendency of the leading edge of a sheet to engage the trailing edge of the immediately preceding sheet and the possibility of scratching the sheets as they are disposed in overlapping relation. The present invention, therefore, has for its principal object the provision of a classifier or conveyor in which the sheets are slowed down as they travel through the conveyor and are accurately deposited in shingled or overlapping relationship to each other on one of the conveyor belts with the possibilities of damage to the sheets or jamming or cobbling of the apparatus substantially eliminated. Another object is the provision of such an apparatus which will operate effectively at both high and low speeds. A further object is the provision of such an apparatus which is simple and sturdy in construction and operation and which does not add greatly to the cost of the classifying apparatus.

Figure 9:
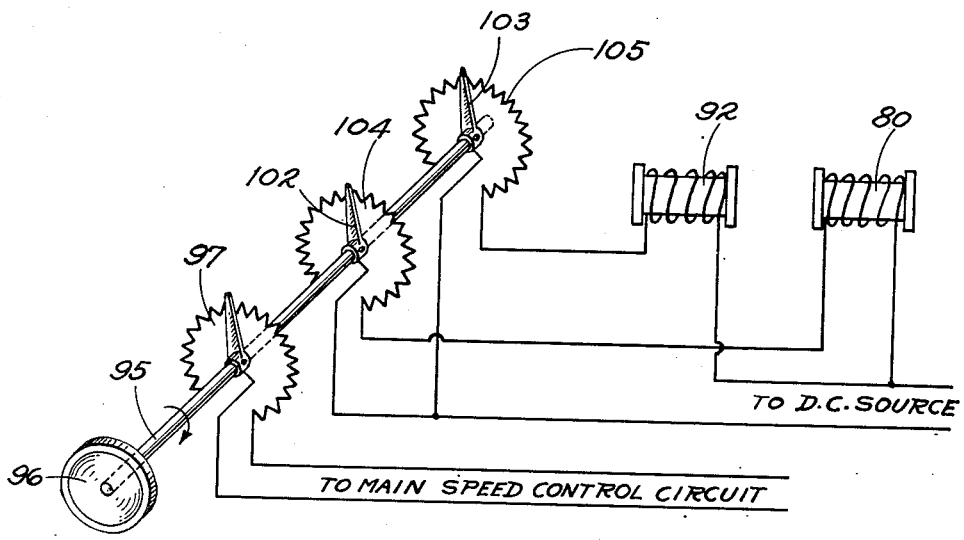

Further objects and advantages of the invention will become apparent from the following description of a preferred embodiment thereof, reference being made to the accompanying drawings in which Figure 1 is a somewhat schematic plan view of a classifier embodying the invention illustrating in addition to the classifier proper a micrometer for gauging the strip and a flying shear for shearing the strip into sheets; Figure 2 is an elevation of the apparatus shown in Figure 1; Figure 3 is an enlarged sectional detail of the shingling apparatus in the prime flight of conveyors; Figure 4 is a detail in plan of the shingling apparatus; Figure 5 is a transverse view of the apparatus shown in Figure 4 taken along the line 5—5 of Figure 3; Figure 6 is a sectional detail on an enlarged scale showing the shingling apparatus as installed in a reject flight; Figure 7 is a transverse view of the apparatus shown in Figure 6, the view being taken as shown in the line 7—7 of Figure 6; and Figures 8 and 9 are simplified circuit diagrams showing controls for the magnets employed in the shingling apparatus.

Briefly, the present invention contemplates a conveyor embodying at least two conveyors, preferably of the belt type, the second belt conveyor which receives sheets discharged from the first belt conveyor being operated at a speed sufficiently slower than the speed of the first belt conveyor so that the sheets must be overlapped or shingled on the second conveyor. In order to insure the shingling operation being carried out properly and without damage to the sheets or jamming of the apparatus, a deflector or "shingling plate" or other means is provided to bend the sheets so that they are concave upwardly in a direction transverse to their direction of movement and thus are given longitudinal stiffness; therefore, the leading edges of the plates as they are discharged from the first conveyor over the first plate are held substantially in the plane of the first conveyor by their own stiffness. The second belt conveyor is disposed slightly below the plane of the first belt conveyor and preferably an electromagnet is provided to draw the trailing edges of the sheets down into contact with the second belt conveyor immediately after they cease to be supported by the bending means. Thus, the trailing edges of the sheets are moved down out of the paths of the leading edges of the following sheets and the possibility of fouling or jamming of the sheets in their travel through the conveyor is eliminated. The magnet serves the further purpose of increasing the frictional engagement between the sheets and the second belt conveyor so that the sheets are promptly slowed down to the speed of the second belt conveyor. Preferably the shingling is accomplished by means of a polished plate, preferably composed of non-magnetic material, in the shape of a very flat V which deflects the edges of the sheets upwardly while a magnet disposed beneath the plate is employed to hold the centers of the sheets down into engagement with the plate.

According to a preferred form of the invention, and as shown in Figures 1 and 2, a strip S of tin plate or other magnetic material to be classified is first passed through a flying micrometer or other suitable gauge G and then to the flying shear 10 which shears it into sheets 11, a few of which are shown in various locations on the conveyor belts in Figure 2. From the shear the sheets severed from the strip are deposited on the first conveyor 12 which, like the conveyors disclosed in the aforesaid Taylor patent and the remaining conveyors in the classifier, is made up of a pair of spaced parallel belts operating on rollers or pulleys at the ends of the belts.

The conveyor 12 is driven at a substantially greater speed than the speed of the strip entering the shear. The purpose of the increased speed of operation is to space the sheets apart on conveyor 12 to give time for the deflector 13 to operate in accordance with the signals given to it by the flying micrometer G, the sheets being delivered to the deflector 13 from the conveyor 12. The arrangement is such that sheets within the established gauge tolerances pass directly over the flipper or deflector 13 onto the on-gauge or prime flight made up of conveyors 15, 16 and 17 and leading to plier 18, while sheets that are not within the established tolerances are deflected downwardly by the flipper or deflector 13 onto the reject flight made up of conveyors 19, 20 and 21 and leading to the plier 22. Hold down rolls 23 are positioned in advance of the deflector 13 to hold the sheets properly in engagement with conveyor 12 at the time the leading edges of the sheets pass over or beneath the deflector.

As previously noted, each conveyor is made up of two parallel belts, and the several conveyors are provided with individual motor drives, motor 25 driving conveyor 12 through chain 26, and motors 27, 28 and 29 driving conveyors 15, 16 and 17, respectively, through similar chains. The conveyors 19, 20 and 21 of the reject flight are similarly driven by motors 30, 31 and 32. The speeds of the motors are preferably individually controllable by means of rheostats or other appropriate controls not shown, and the speed of the shear 10 is likewise independently controllable. Preferably the speeds of all of the motors in the line can also be simultaneously varied by means of a variable voltage control supplying current to the shear motor and all of the conveyor motors.

The sheets discharged by the last belts in each flight drop onto the pilers 18 and 22 which consist of elevating platforms 35 and 36 having their upper surfaces made up of conveyor rolls 37 and 38. These platforms are raised at the beginning of a run and gradually lowered by the operator as sheets accumulate on them, and roller conveyors 39 and 40 are provided for removing piled sheets from the platforms in lateral directions. The pilers preferably are constructed as described and claimed in the copending application of Perry G. Snyder, Serial No. 132,649, filed December 13, 1949.

In order to retain the sheets in position on the belts and to straighten them if they beome askew in their travel through the apparatus, electromagnets are disposed in pairs beneath the upper reaches of the belts of the several conveyors. The magnets associated with conveyor 12 are indicated at 43, 44 and 45 and those associated with conveyor 15 at 46, 47 and 48. Magnets 49 and groups of magnets 50 are positioned beneath the upper reaches of the belts in conveyor 16, and magnets 51a and 52a beneath the upper reaches of the belts in conveyor 17. Similar magnets are employed in conjunction with the conveyors in the reject flight, these magnets and groups of magnets being indicated by reference characters 51, 52, 53, 54, 55, 56 and 57. Preferably the magnets are constructed and arranged as described in the aforesaid Taylor patent and in the copending application of Perry G. Snyder and Neil T. Gordon, Serial No. 104,078, filed July 11, 1949, the energization of the magnets being controllable by the operator through suitable circuits and the push-button switchboards 58 and 59 for the prime and reject flights respectively.

As noted above, classifiers of this type are designed for operation at high speeds. For example, the strip may enter the shear at a speed of approximately 1,000 feet per minute and the conveyor 12 may be operated at a speed of 1,133 feet per minute. Because of the increase in speed the sheets are spaced apart a few inches on conveyor 12. The speed of the sheets is progressively reduced as they travel along subsequent conveyors so that the sheets can be piled accurately without damage. In the example given, conveyor 15 may be operated at a speed of 1,066 feet per minute, conveyor 16 at about 650 feet per minute and conveyor 17 from about 200 to 450 feet per minute. The reduction of speed on conveyor 15 reduces the spacing between the sheets to a fraction of an inch while on conveyor 16 the sheets overlap each other in a shingled manner, the overlapping amounting to about 35% on conveyor 16 and the overlap increasing to 60% to 80% as the speed of the sheets is further reduced as they reach conveyor 17. The speeds of the conveyors in the reject flight are preferably of the same order.

Because of the speed at which the sheets follow each other and the tendency of the sheets to be deflected by the air and to bend under their own weight, the problem of securing the essential overlap or shingling of the sheets as they are transferred from conveyor 15 to conveyor 16 has been a difficult one and it is to the solution of this problem that the present invention is particularly addressed.

The difficulties arise largely because of engagement between the leading edge of a following sheet which has not yet touched the receiving conveyor 16 and the trailing edge of a preceding sheet which is at least in part in contact with conveyor 16; under such circumstances the following sheet is traveling at substantially the speed of the delivering conveyor 15 while the speed of the preceding sheet has been slowed down by engagement with the relatively slower receiving conveyor 16. To eliminate the possibility of such engagement and to insure the deposition of the sheets on conveyor 16 in accurate shingled relationship, I preferably dispose the receiving conveyor 16 at a lower level than the line of delivering conveyor 15 and provide means for preventing the leading edges of the sheets from dropping down onto the receiving conveyor for as long a time as possible while urging the trailing edges of the sheets downwardly toward the receiving conveyor and thus out of the path of the leading edges of the faster moving following sheets.

In order to hold the leading edges of the sheets above the receiving conveyor 16, the shingling plate indicated in general at 60 is provided; this plate is interposed between the conveyors 15 and 16. The construction and arrangement of the shingling plate 60 and associated parts are shown particularly in Figures 3, 4 and 5. Co-operating with the shingling plate and interposed between the shingling plate and conveyor 15 is a pair of burr-masher rolls 62 which function to remove any upstanding burrs or rough edges of the sheets and hold the sheets securely as they pass from the conveyor 15 to the shingling plate 60. The burr-masher rolls operate in the plane of conveyor 15 and are driven at the same speed as the conveyor 15 through chain 63 (see Figure 2).

From the burr-masher rolls sheets pass over the shingling plate 60 which preferably is a highly polished metal plate preferably composed of a non-magnetic or slightly magnetic metal, stainless steel being satisfactory. Preferably, the upper surfaces of the plate, which come into contact with the sheets, are chromium plated. As shown in Figures 4 and 5, the plate is supported from the frame of the apparatus by brackets 64 and bolts 65, the brackets being slotted as at 66 so that the plate can be adjusted to the proper level with its central portion lying in the plane of conveyor 15 and the bite of the rolls 62. The rear edge 70 of the plate is preferably turned down as shown in Figure 3 to receive the leading edges of the sheets and the rear portion 71 is flat and deposited substantially in the plane of the upper surface of the conveyor 15. The edges 73 of the plate, however, are bent progressively upwardly to greater degrees while the central portion 74 of the plate remains in the plane of the conveyor 15 throughout its length. The shape of the upper surface gradually changes from a plane at the rear portion 71 to a flat V at the front edge 75, the plane central portion becoming progressively narrower from rear to front and disappearing at the front edge as shown in Figure 4.

The effect of the shingling plate on the sheets is to bend upwardly the edges of the sheets somewhat in the manner shown in Figure 3 where the sheet S₂ is shown as being projected from the shingling plate with the edges thereof bent upwardly and the central portion 77 lying in contact with or closely adjacent to the central portion 74 of the shingling plate. The sheets are bent transversely into an upwardly concave form and are therefore stiffened longitudinally.

In order to urge the central portions of the sheets downwardly toward the lower central portion 74 of the shingling plate and to insure that sheets will take the desired concave shape, an electromagnet 80 is disposed beneath the center of the shingling plate. Thus, as the sheets travel over the shingling plate the edges are bent upwardly while the center is held down, curving the sheets in direction transverse to their direction of travel and giving them an upwardly concave shape which increases their longitudinal stiffness and prevents the leading edges of the sheets from dropping downwardly toward the conveyor 16. It will be noted that with sheets of the usual dimensions handled in the apparatus, the trailing edges of the sheets remain in engagement with and are held down by the burr-masher rolls 62 while the forward edges project substantially beyond the shingling plate; this action assists in holding the forward edges of the sheets up above the conveyor 16.

The action of magnet 80 also assists in holding the forward edges of the sheets up. However, shortly after the trailing edges of the sheets are released from the burr-masher rolls 62 the sheets start to fall toward conveyor 16, the magnets 49 and 50 acting to attract the sheets to the conveyor and to hold the sheets on the conveyor so that the frictional engagement between the sheets and the conveyor belts is increased and the sheets slowed down to the speed of conveyor 16. Magnets 49, however, have very little effect on the leading edges of the sheets which are held up as shown in Figure 3 but act strongly on the trailing edges of the sheets to draw the trailing edges down into contact with the belts of conveyor 16 promptly after the trailing edges leave the shingling plate 60. Thus, as shown in Figure 3, the trailing edge of sheet $S_1$ has been drawn down into engagement with the belt in the region of the magnet 49 while the leading edge of sheet $S_2$ is held upwardly by the stiffness of the concave sheet and the action of the rolls 62 and magnet 80. The sheet $S_1$ has been slowed down by frictional engagement with the conveyor 16 and thus the leading edges of sheet $S_2$ overlaps the trailing edge of sheet $S_1$ so that when sheet $S_2$ drops onto sheet $S_1$ the sheets will lie in proper shingled relationship without any danger of fouling. Sheet $S_3$ is following close behind sheet $S_2$ and will be deposited on sheet $S_2$ just as $S_2$ will be deposited on $S_1$. In the position shown in Figure 3, sheet $S_1$ has been slowed down by engagement with the belts and the preceding sheet while $S_2$ is still traveling at the speed of conveyor 15. $S_2$ is therefore overtaking $S_1$ and this action continues until $S_2$ is slowed down to the speed of conveyor 16 at which time $S_2$ will overlap $S_1$ by the required amount.

The sheets continue in their travel through the remainder of the apparatus in overlapping relationship, the amount of overlapping being increased as the speed of the sheets is reduced when they are deposited on conveyor 17.

A shingling plate 85, generally similar to the shingling plate 60 just described, is provided in the lower or rerejected flight of conveyors, the plate being located between the delivering conveyor 19 and the receiving conveyor 20, these conveyors being operated at speeds comparable to the speeds of the corresponding conveyors 15 and 16. The arrangement and operation of the shingling plate 85 is substantially identical with the arrangement of operation of the shingling plate 60. However, in the apparatus shown in the drawings there are no burr-masher rolls in the lower flight; hold-down rolls 86 are employed to hold the sheets in engagement with the conveyor 19 as they are discharged therefrom. The arrangement is illustrated particularly in Figures 6 and 7 wherein it will be seen that the rolls 86 are adjustably mounted in bearing blocks 87 which are supported by brackets 88, the brackets in turn being carried by the frame members 89.

The rolls 86 have cushioned peripheral portions 90 composed of rubber or rubber-like material and the rolls are preferably disposed to bear down on the sheets in the zone immediately above the pulleys 91 which support the belts of the conveyor 19. In this position, the hold-down rolls function to hold down the trailing edges of the sheets in the same manner as the burr-masher rolls 62 previously described. The hold-down rolls, however, are not independently driven, being rotated solely by engagement with the sheets or with the belts of conveyor 19.

An electromagnet 92 is positioned beneath the center of the shingling plate 85 and functions in the manner of magnet 80 previously described. Magnet 54, adjacent the end of the shingling plate and positioned beneath the belts of conveyor 20, functions to draw the trailing edges of sheets discharged from the shingling plate down into contact with the conveyor 20 and corresponds to magnet 49 previously described. The operation is as described with respect to the upper flight, the sheets being bent into concave form and thereby given lateral stiffness by the action of the shingling plate and magnet 92 so that the forward edges of the sheets are held above the conveyor 20 until the trailing edges of the sheets have been discharged from the holddown rolls 86. The magnet 54 functions to draw the trailing edges of the sheets into engagement with the conveyor 20, thus removing the trailing edges from the path of the leading edges of following sheets.

It has been found that the magnets 80 and 92 beneath the shingling plates 60 and 85 respectively are not required at slow operational speeds. In fact, under some circumstances, the magnets are disadvantageous at low speeds because they tend to cause the sheets to stick to the shingling plates. Accordingly, the magnets 80 and 92 are preferably energized only when the speed of the conveyors 15 and 19 exceeds a predetermined figure, for example, 400 feet per minute. A suitable circuit for accomplishing this result is shown diagrammatically in Figure 8 in which the shaft 95 which carries the control knob 96 and the main speed control rheostat also carries arms 98 and 99 which are arranged to trip switches 100 and 101 respectively when the control knob is turned to bring the speed of the belts in excess of the predetermined figure; switch 100 controls the circuit to magnet 80 while switch 101 controls the circuit to magnet 92. When the arcuate portions of the arms 98 and 99 are moved out of engagement with the switches 100 and 101 by rotation of the knob 96 and shaft 95 in the opposite direction, then the switches open and the magnets are de-energized as the speed of the apparatus is reduced.

A modified arrangement for controlling the magnets 80 and 92 is shown diagrammatically in Figure 9. Here the shaft 95 which is controlled by knob 96 has on it the motor speed control rheostat 97 as before described, and also has the contact arms 102 and 103 of rheostats 104 and 105. With this arrangement, resistance of the rheostats 104 and 105 is gradually reduced as the speed of the apparatus is increased, thereby increasing the energization of the magnets 80 and 92 with the increasing speed. In both Figures 8 and 9 the energization of the magnets can be adjusted to suit conditions simply by rotating the arms 98 and 99 or 102 and 103 with respect to the shaft 95, set screws or other similar means being provided to hold the arms in any desired position of adjustment on the shaft 95. By these arrangements the energization of the magnets 80 and 92 can be controlled to obtain proper operation at both high and low conveyor speeds. The push buttons 58 and 59, of course, provide for control of the remaining magnets in the conveyor system.

From the foregoing description of a preferred form of my invention it will be evident that I have provided an apparatus which is adapted to convey sheet materials and particularly sheets of magnetic materials at high speeds and to shingle the sheets with respect to each other as their speed is slowed down, without damage to the sheets and without danger of jamming or fouling the machine. The apparatus is reliable in operation and the shingling plate and associated parts add little to the cost of the complete apparatus.

Those skilled in the art will appreciate that various changes and modifications may be made in the apparatus shown herein without departing from the spirit and scope of the invention, which is defined in the appended claims.

I claim:

1. In an apparatus of the character described, a generally horizontal delivering conveyor for handling rapidly moving closely spaced successive sheets of magnetic material comprising spaced parallel endless belts supported by rolls at each end and continuously moving at a relatively high speed, a generally horizontal receiving conveyor adapted to receive sheets from said delivery conveyor and continuously moving at a slower speed, said receiving conveyor being disposed beneath the projection of the line of travel of said sheets, means adjacent the discharge end of said delivering conveyor to give a laterally concave shape to said sheets as they leave said delivering conveyor providing cantilever strength to said sheets whereby said sheets project a substantial distance over said receiving conveyor without substantial sagging, said means comprising an electromagnet adapted to urge the centers of the sheets downwardly, a plate adapted to raise the edges of the sheets with respect to their centers and a roll disposed in advance of said plate and adapted to engage the upper surfaces of the trailing portions of said sheets while the leading portions are in engagement with said plate, and magnet means associated with said receiving conveyor immediately adjacent the point at which said sheets are fed onto said receiving conveyor adapted to draw the trailing portions of said sheets into contact with said receiving conveyor.

2. In an apparatus of the character described, a generally horizontal delivering conveyor for handling sheets of magnetic material comprising spaced parallel endless belts supported by rolls at each end and continuously moving at a relatively high speed, a generally horizontal receiving conveyor adapted to receive sheets from said delivering conveyor and continuously moving at a slower speed, said receiving conveyor being disposed beneath the projection of the line of travel of said sheets, means adjacent the discharge end of said delivering conveyor to give a laterally concave shape to said sheets as they leave said delivering conveyor providing cantilever strength to said sheets whereby said sheets project a substantial distance over said receiving conveyor without substantial sagging, and magnet means associated with said receiving conveyor immediately adjacent the point at which said sheets are fed onto said receiving conveyor adapted to draw the trailing portions of said sheets into contact with said receiving conveyor.

3. In a conveyor system for classifiers or the like, in which sheets are discharged from a generally horizontal continuously moving delivering belt conveyor onto a generally horizontal receiving belt conveyor continuously moving at a speed lower than the speed of said delivering belt conveyor, means positioned between said conveyors for bending the sheets laterally into an upwardly concave form whereby said sheets are given a stiffness to project a substantial distance over said receiving conveyor, said means comprising a plate having a surface the edges of which are raised progressively higher with respect to the center in the direction of travel of the sheets and magnet means disposed beneath the center of said plate and adapted to draw the centers of said sheets downwardly, and a magnet associated with the second belt conveyor and located immediately beyond said plate in a position to draw the trailing portions of said sheets into contact with the second conveyor immediately after said trailing portions leave said plate.

4. A conveyor system according to claim 3 wherein a roll is disposed immediately in advance of said plate, said roll engaging the upper surfaces of said sheets and holding the sheets down.

5. In a conveyor system for sheet material, a generally horizontal continuously moving delivering conveyor, a generally horizontal continuously moving receiving conveyor adapted to receive sheets from said delivering conveyor and positioned at a level below the line of discharge of sheets from said delivering conveyor, means positioned between said conveyors to impart longitudinal stiffness to said sheets as they are being delivered to said receiving conveyor comprising a plate disposed in the path of sheets discharged from said delivering conveyor, the edges of said plate being raised with respect to the center thereof and being adapted to engage the edge portions of said sheets, and an electromagnet for urging the centers of the sheets downwardly toward the center of said plate, whereby the sheets are bent laterally into an upwardly convex form, a roll disposed immediately in advance of said plate and adapted to hold the trailing edges of the sheets down while the leading edges thereof project beyond the plate, and an electromagnet associated with the receiving conveyor and adapted to urge the trailing edges of the sheets downwardly immediately after they are disengaged from said plate.

6. A conveyor system according to claim 5 wherein said roll is one of a pair of burr-masher rolls disposed between said delivering conveyor and said plate.

7. A conveyor system according to claim 5 wherein said roll is disposed above the delivering end of said delivering conveyor.

8. In a conveyor system for sheet material, a generally horizontal continuously moving delivering conveyor, a generally horizontal continuously moving receiving conveyor adapted to receive sheets from said delivering conveyor and positioned at a level below the line of discharge of sheets from said delivering conveyor, means positioned between said conveyors to laterally bend said sheets into upwardly concave form to impart longitudinal stiffness to said sheets as they are being delivered to said receiving conveyor comprising means disposed in the path of sheets discharged from said delivering conveyor for engaging the edge portions of said sheets and raising them with respect to the centers thereof, and an electromagnet for urging the centers of the sheets downwardly toward the center of said plate, a roll disposed immediately in advance of said bending means and adapted to hold the trailing edges of the sheets down while the leading edges thereof project beyond bending means, and an electromagnet associated with the receiving conveyor and adapted to urge the trailing edges of the sheets downwardly immediately after they are disengaged from said plate.

9. In a conveyor system for sheet material, means adapted to feed sheets onto a generally horizontal continuously moving receiving conveyor at a speed greater than the speed of the receiving conveyor whereby said sheets are deposited on said receiving conveyor in partially overlapping relation with the leading portion of each sheet overlying the trailing portion of the preceding sheet, means to bend said sheets in a lateral direction into an upwardly concave form immediately prior to transferring the same to said receiving conveyor whereby each sheet is given stiffness to enable the leading portion of the sheet to project a substantial distance over and above the trailing portions of a preceding sheet lying on said conveyor and means for exerting a force on the trailing portions of said sheets to urge said trailing portions downwardly into contact with said conveyor.

10. The method of depositing rapidly and continuously moving closely spaced successive sheets of material in overlapping shingled arrangement on a substantially horizontal receiving conveyor which includes the steps of successively discharging the sheets from a delivering conveyor travelling at a higher speed than the receiving conveyor at a level above the level of the receiving conveyor, bending the sheets into laterally concave shape as they leave the delivering conveyor to give them longitudinal stiffness, holding the trailing portions of the sheets down as they leave the delivering conveyor whereby the leading portions are held up by reason of the longitudinal stiffness of the sheets, and urging the trailing portions of the sheets downwardly toward the receiving conveyor adjacent the receiving end of the receiving conveyor.

11. The method of depositing rapidly and continuously moving closely spaced successive sheets of magnetic material in overlapping shingled arrangement on a substantially horizontal receiving conveyor which includes the steps of successively discharging the sheets from a delivering conveyor travelling at a higher speed than the receiving conveyor at a level above the level of the receiving conveyor, bending the sheets into laterally concave shape as they leave the delivering conveyor by magnetically urging the centers of the sheets downwardly with respect to the edges of the sheets to give them longitudinal stiffness, holding the trailing portions of the sheets down as they leave the delivering conveyor whereby the leading portions are held up by reason of the longitudinal stiffness of the sheets, and magnetically urging the trailing portions of the sheets downwardly toward the receiving conveyor adjacent the receiving end of the receiving conveyor.

References Cited in the file of this patent

UNITED STATES PATENTS

| Number | Name | Date |
| --- | --- | --- |
| 1,750,396 | Evans | Mar. 11, 1930 |
| 1,777,139 | Fitzgerald | Sept. 30, 1930 |
| 1,891,286 | Miersch | Dec. 20, 1932 |
| 2,146,581 | Kaufman | Feb. 7, 1939 |
| 2,162,889 | Hormel | June 20, 1939 |
| 2,328,859 | Taylor | Sept. 7, 1943 |
| 2,626,800 | Martin | Jan. 27, 1953 |